United States Patent [19]

Cooper

[11] Patent Number: 5,569,073
[45] Date of Patent: Oct. 29, 1996

[54] SYSTEM FOR THE REMOVAL AND DISPOSAL OF AIRBORNE CONTAMINANTS FROM AN OUTDOOR PAINT BOOTH

[75] Inventor: Guy F. Cooper, Ventura, Calif.

[73] Assignee: The United States of America as represented by the Secretary of the Navy, Washington, D.C.

[21] Appl. No.: 404,846

[22] Filed: Mar. 15, 1995

[51] Int. Cl.⁶ .......................... B05B 15/12; B05C 15/00
[52] U.S. Cl. ............... 454/54; 454/53; 110/235; 110/212; 110/217
[58] Field of Search .................. 34/79, 81, 82, 34/467, 478, 480; 454/50–54; 110/212, 214, 216, 217, 235, 346; 118/326

[56] References Cited

U.S. PATENT DOCUMENTS

| | | |
|---|---|---|
| 4,285,270 | 8/1981 | Donahue . |
| 4,704,952 | 11/1987 | Johnson et al. . |
| 4,957,710 | 9/1990 | Nagai et al. ............... 34/79 X |
| 5,147,422 | 9/1992 | Neeley et al. . |

*Primary Examiner*—Henry A. Bennett
*Assistant Examiner*—Susanne Tinker
*Attorney, Agent, or Firm*—David S. Kalmbaugh; Melvin J. Sliwka

[57] ABSTRACT

A system for removing airborne contaminants from the effluent air streams from spray paint booths and the like. The system includes a rectangular shaped underground pool having pool of water positioned below the work area. The underground pool has a plurality of suction pipes which are uniformly distributed throughout the pool at a distance of between one and two inches above the pool of water. The suction pipes terminate in a plenum located adjacent the underground pool. A gas turbine engine which is connected to the plenum is used to draw air including airborne contaminants into the plenum from the work area. Solid airborne contaminants such as droplets of water soluble paint, sand and the like will fall into the pool of water. Lighter airborne contaminants, such as gaseous toxins are drawn through the gas turbine type engine into a after-burning incinerator. At the front end of the after-burning incinerator are a plurality of gas burning elements which supply heat to bed of pebbles which may be quartz, zirconium or high temperature ceramics pebbles. The bed of pebbles incinerates the airborne contaminants within the air streams entering the after-burning incinerator expelling clean air into vertical exhaust stack coupled to the exhaust end of the after-burning incinerator.

19 Claims, 3 Drawing Sheets

SYSTEM FOR THE REMOVAL AND DISPOSAL OF AIRBORNE CONTAMINANTS FROM AN OUTDOOR PAINT BOOTH

BACKGROUND OF THE INVENTION

1. Field of the Invention

The present invention relates generally to a system for the removal of airborne contaminants. In particular, the present invention to a system in effluent air streams from outdoor paint booths, sand blasting facilities and the like.

2. Description of the Prior Art

The effluent air streams from industrial and military paint booths, such as an outdoor facility for painting an aircraft, and the like may contain a number of airborne contaminants. The constitution of these contaminants depends upon the particular paints and solvents which are utilized, but typically an array of both water insoluble contaminants and water soluble contaminants is present. Examples of water insoluble contaminants which might be present include hexanes, heptanes, octanes, nonanes xylenes, naphthas and mineral spirits. Examples of water soluble contaminants which might be present would include alcohols, ketones, esters and others. Other contaminants may include water soluble but high boiling substances such as glycol ethers. Airborne particulate contaminants may also be present.

The statutes, laws and regulations of the United States and the various state governments provide for strict clean air standards. The United States Environmental Protection Agency, for example, which is responsible for enforcing the United States government clean air standards mandates strict adherence to these standards by industry, the military, state and local municipalities and the like. These standards, for example, require the removal of solvents and other contaminants which are harmful to clean air from the effluent air steams from paint booths and the like prior to venting these streams to the atmosphere.

The aircraft, ship building and auto industries have had difficulty in meeting clean air objectives while avoiding excessive operating cost. The magnitude of painting processes in these industries and, in particular, the spray painting processes, produce a very large air and contaminant flow which is difficult to treat economically by conventional contaminant removal processes. Higher operating cost are ultimately passed on to the end user of the product.

The technology of unit operations capable of performing specific separation functions for most chemicals at commonly encountered operating conditions is well known in, for example, the chemical engineering art. The art has not heretofore known, however, a satisfactory system for removing airborne contaminants from the effluent air streams of paints booths and the like, and especially from the effluent air streams from spray paint booths of the sort used in the aircraft, ship building and auto industries.

Accordingly, there is a need to provide an improved system for removing airborne contaminants from the effluent air streams from spray paint booths of the sort used in the aircraft, ship building and auto industries which is substantially less expensive and yet is very efficient and highly reliable.

SUMMARY OF THE INVENTION

The present invention overcomes some of the disadvantages of the prior art, including those mentioned above in that it comprises an efficient yet relatively simple system for removing airborne contaminants from the air streams from spray paint booths and the like. The system of the present invention includes a rectangular shaped underground pool having a pool of water positioned below the work area. There is positioned within the underground pool a plurality of suction pipes which are uniformly distributed throughout the pool at a height of between one and two inches above the pool of water. The suction pipes terminate in a plenum located adjacent the underground pool. A gas turbine type engine which is connected to the plenum is used to draw air including airborne contaminants into the plenum from the work area. Heavy or solid airborne contaminants such as droplets of water soluble paint, sand and the like will fall into the pool of water. Lighter airborne contaminants, such as gaseous toxins and fine mist of paint are drawn through the gas turbine type engine into an after-burning incinerator. At the front end of the after-burning incinerator are a plurality of gas burning elements which supply heat to bed of pebbles which may be quartz, zirconium or high temperature ceramics pebbles. The bed of pebbles incinerates the airborne contaminants within the air streams entering the after-burning incinerator expelling clean air into vertical exhaust stack coupled to the exhaust end of the after-burning incinerator.

DETAILED DESCRIPTION OF THE PREFERRED EMBODIMENT

Figure 1:
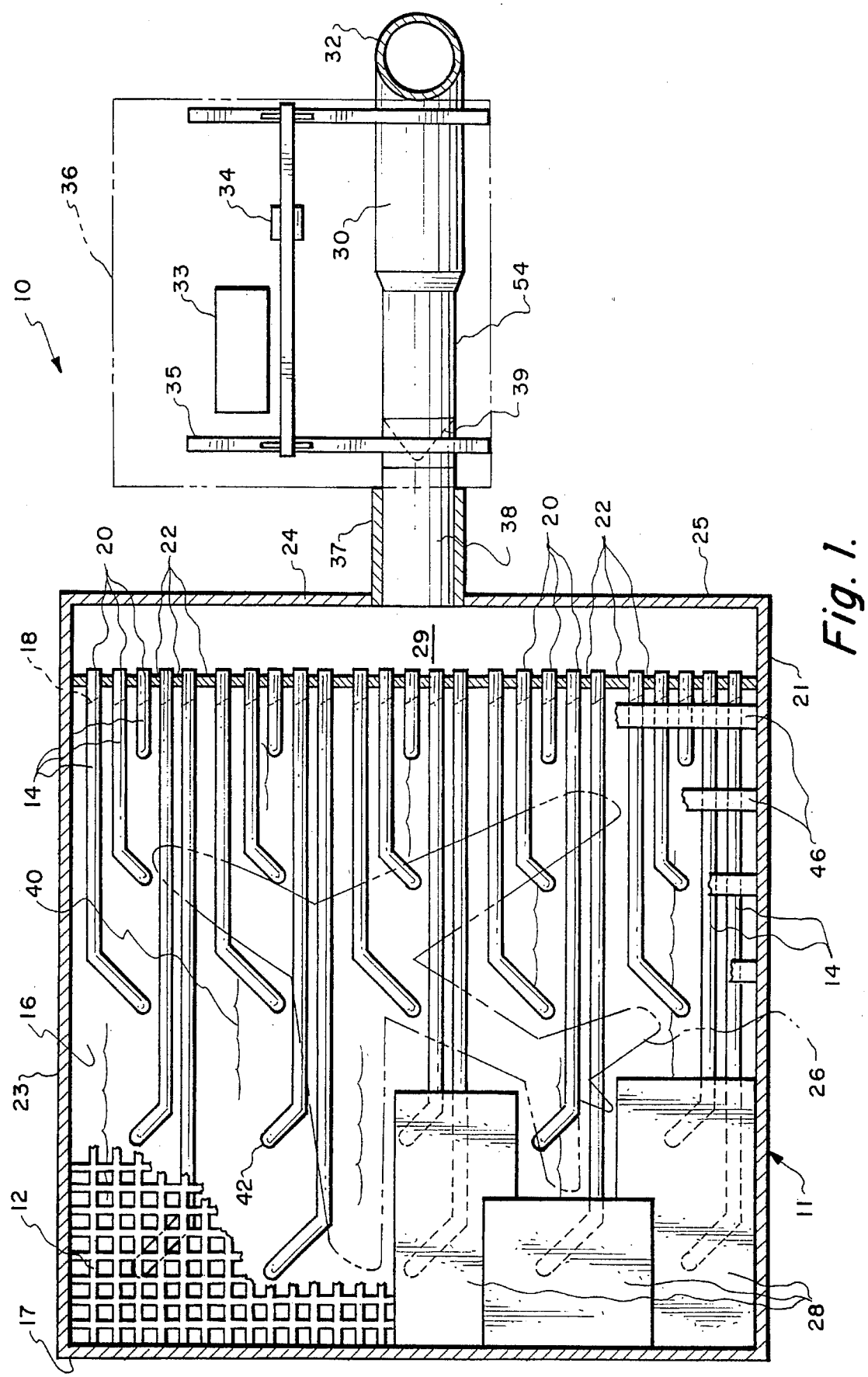
FIG. 1 is a plan view of system for the removal and disposal of airborne contaminants from an outdoor paint booth which constitutes the present invention.
Figure 2:
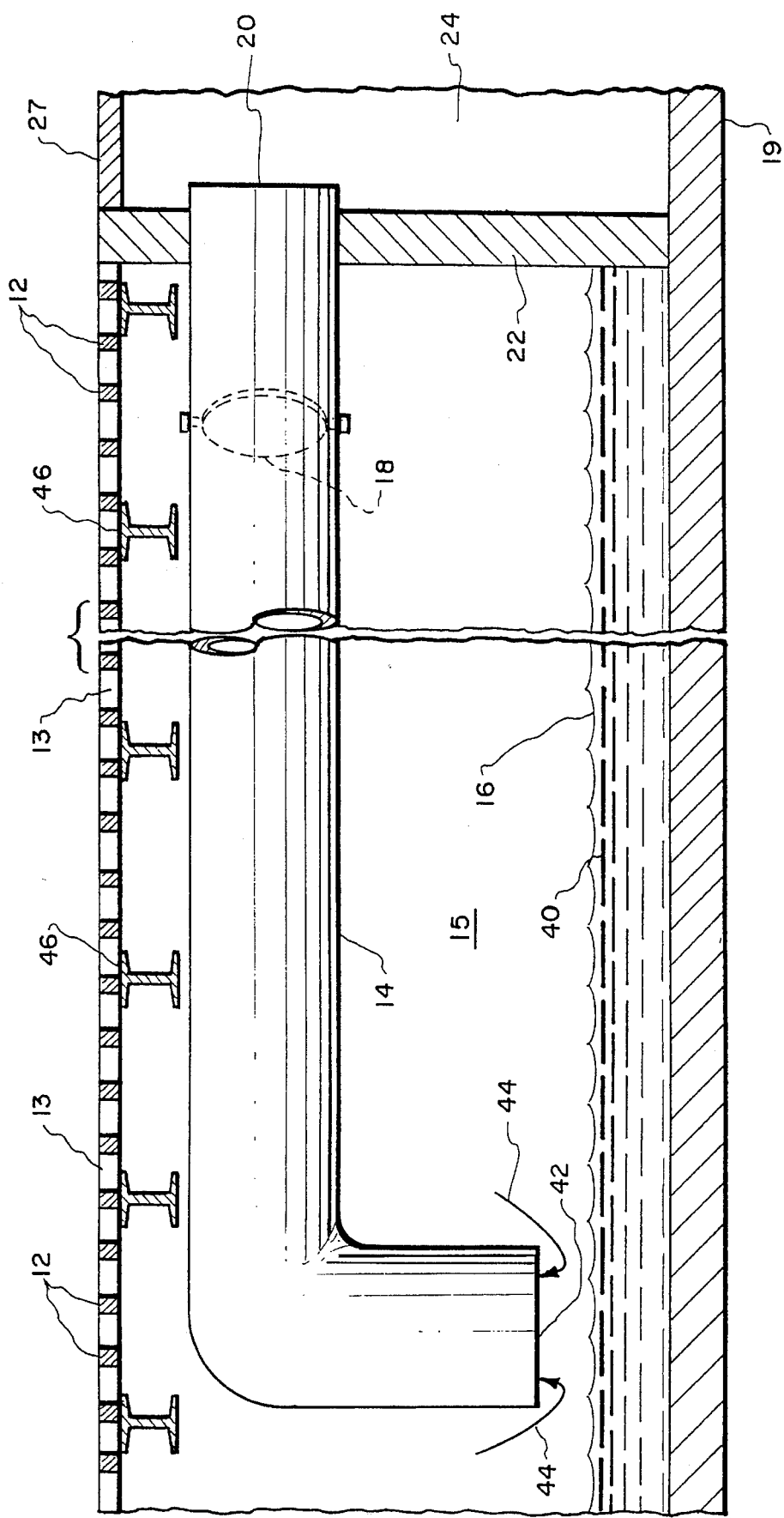
FIG. 2 is a side view partially in section illustrating a typical suction pipe and the water pool of the system of FIG. 1.

Referring to FIGS. 1 and 2, there is shown a system, designated generally by the reference numeral 10, for the removal and disposal of airborne contaminants from an outdoor paint booth and the like. System 10 includes a grillwork deck 12 which supports an object, such as aircraft 26 (illustrated in phantom in FIG. 1) to be spray painted in an outdoor environment. Grillwork 12 is also adapted to provide support for other objects such as trucks, automobiles, railway cars when rails are provided, radar antenna and other military equipment which are being spray painted.

Grillwork 12 is mounted on top of a generally rectangular shaped underground pool 11 formed by side walls 17, 21, 22 and 23 and a floor/base 19 and is supported by a plurality of I beams 46 which extend horizontally from side wall 21 to side wall 23 of pool 11 so that grillwork 10 is level allowing airplane 26 to be placed on grillwork 11 for painting.

At this time it should be noted that underground pool 11 may be fabricated from concrete to allow the bottom portion of underground pool to hold a pool of water several inches deep which is designated generally by the reference numeral 40 in FIGS. 1 and 2. It should also be noted that grillwork 12 and I beams 46 may fabricated from any high strength non-corrosive and chemical resistant steel alloy.

Extending horizontally from a side wall 22 of pool 11 below grillwork 12 into the upper portion 15 of pool 11 are a plurality of suction pipes 14 of various lengths which are supported by side wall 22 of pool 11. As is best illustrated in FIG. 2 each suction pipe 14 has a right angle turn so that it extends vertically downward toward the pool of water 11. Each suction pipe 14 also has a damper valve 18 (illustrated in phantom in FIG. 2) which regulates the flow rate of air streams through the suction pipe 14. Utilizing a damper valve 18 within each suction pipe 14 allows the user of system 10 to tune system 10 so that each suction pipe 14 draws air at a uniform flow rate to create a uniform down flow through grillwork 12.

System 10 further comprises a plenum 24 which is located on the side of wall 22 opposite pool of water 40. Plenum 24 is formed by side walls 22 and 25, a portion of side walls 21 and 23, an upper covering/ceiling 27 and a portion of base 19 and has an airtight inner chamber 29 to receive airborne contaminants from underground pool 11 and prevent these airborne contaminants from escaping into the atmosphere or in flow of air from the atmosphere.

Each suction pipe 14 has one opening 42 positioned at a height between one and two inches above the top surface 16 of pool of water 40 and a second opening 20 within plenum 24. A gas turbine type engine 54 which is connected to plenum 24 by an S-shaped pipe 38 is used to draw air including airborne contaminants through plenum 24 into engine 54. Support for S-shaped pipe 38 is provided by an S-shaped concrete support sleeve 37. Pipe 38 is provided within an S-shape since plenum 24 is underground and the gas turbine engine 54 is housed in a building 36 (illustrated in phantom in FIG. 1) which is above ground. S-shaped pipe 38 also has a protective screen 39 placed near the intake of gas turbine engine 54 which prevents fairly large airborne contaminants or particles from entering engine 54 and damaging the blades of engine 54.

Engine 54 may be, for example, a Pratt and Whitney TF-30-P-6E gas turbine engine which would provide for a maximum flow rate of approximately 220 cubic feet of air per second into plenum 24. By positioning the suction pipes 14 throughout underground pool 11 in a uniform manner as illustrated in FIG. 1 and utilizing the damper valve 18 within each suction pipe 14, downward suction and thus air flow is maintained at a uniform rate from the work area where aircraft 26 is being painted across underground pool 11 to plenum 24.

Sheets of plywood 28 may be placed on the top of grillwork 12 (as shown in FIG. 1) to mask off that portion of the work surface above pool 11 which is not being used to spray paint aircraft 26. This, in turn, provides for a more efficient operation of system 10 since engine power may be cut back while maintaining air flow from the work surface through underground pool 11 into plenum 24 at the constant rate of 220 cubic feet per second.

System 10 includes a after-burning incinerator 30 which functions as an after-burning incinerator and is housed in building 36. After-burning incinerator 30 at its air inlet side is secured to the exhaust flange 53 of engine 54 by bolts, not shown. Building 36 also has an engine transport cart 33 and a gantry crane 35 which includes a hoist 34. The gantry crane 35 and hoist 34 as well as engine cart 33 may be used to remove gas turbine engine 54 from system 10 for routine maintenance and repair. Connected to the air exhaust side of after-burning incinerator 30 is a vertical exhaust stack 32 which expels clean air into the atmosphere.

Referring to FIG. 2, grillwork 12 has a plurality of rectangular shaped openings 13 through which air streams having airborne contaminants therein are drawn from the work area where plane 26, FIG. 1, is being spray painted. Heavy airborne contaminants such as droplets of water soluble paint, sand and the like will fall into the pool of water 40. After the spray paint operation is finished the water 40 within pool 11 may be withdrawn from pool 11 and then treated using conventional and well known water treatment processes to allow for reuse of the water 40 within pool 11.

Lighter airborne contaminants within the airstream, such as paint vapors, will be drawn upward through opening 42 into suction pipe 14 in the manner illustrated by arrows 44. The positioning of opening 42 of suction pipe 14 in a range of between one and two inches above the surface 16 of pool of water 40 will cause the lighter airborne contaminants within the airstream to be drawn upward into suction pipe 14 at a velocity of about fifty feet per second.

Figure 3:
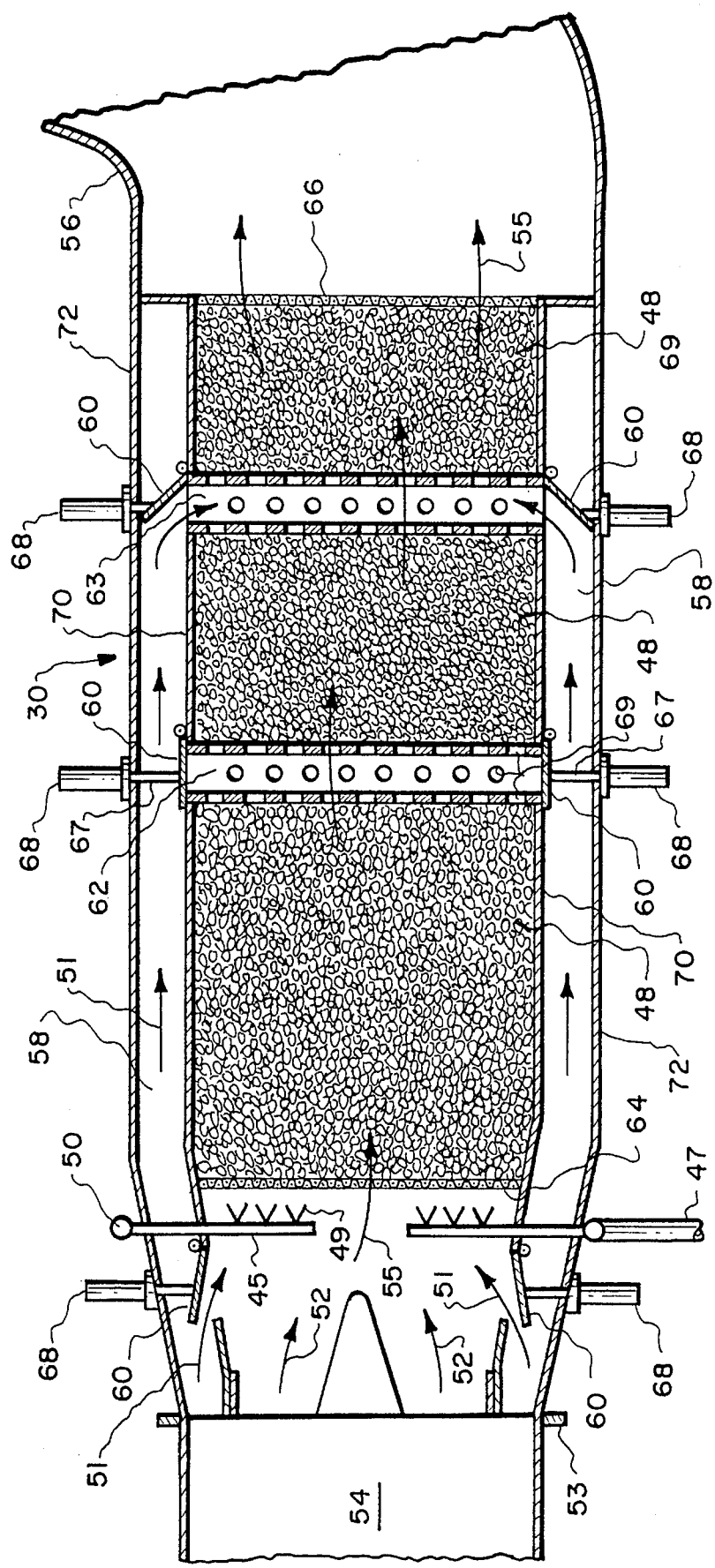
FIG. 3 is a view in section illustrating the after-burning incinerator used in the system of FIG. 1.

Referring to FIGS. 1 and 3, the air streams exiting from gas turbine engine 54 have two components unburnt air (illustrated by arrow 51) which passes through the outer portion of engine 54 and burnt air (illustrated by arrow 52) which passes through the core of engine 54. A portion of the unburnt air is then combined with the burnt air (the combination being illustrated by arrow 55) from the core of gas turbine engine 54 before passing through a retaining screen 64 at the front end of after-burning incinerator 30 into a bed of pebbles 48. Burnt air from the gas turbine engine's core is about 1000 degrees fahrenheit, while unburnt air from gas turbine engine 54 is about 200 degrees fahrenheit.

After-burning incinerator 30 which is generally cylindrical in shape has an outer wall 72 and an inner wall 70. After-burning incinerator 30 also has a retaining screen 66 positioned at its rear end with retaining screens 64 and 66. The combination of inner wall 70 and retaining screens 64 and 66 hold the bed of pebbles 48 within the interior of After-burning incinerator 30. The pebbles of bed 48 may be quartz, zirconium or high temperature ceramics pebbles.

There is also located within after-burning incinerator 30 between outer wall 72 and inner wall 70 an outer passageway 58. Outer passage way 58 is coupled to a pair of inner perforated passageways 62 and 63 which pass through the bed of pebbles 48 with the passageway 62 being positioned near the center of after-burning incinerator 30 and passageway 63 being positioned approximately at halfway between passageway 62 and retaining screen 66 as shown in FIG. 3. Each passageway 62 and 63 has a plurality of openings 69 which allow unburnt air from gas turbine engine 54 to enter the bed of pebbles 48. Each passageway 62 and 63 may, for example, be fabricated from a high temperature steel alloy piping material.

Paralyzer 30 also has six hinged flap valves 60 which control airflow of unburnt air from gas turbine engine 54 through the bed of pebbles 48 in the manner illustrated in FIG. 3. Two of the six valves flap valves 60 are positioned at the front end of paralyzer 30 to control air flow through the front end of bed of pebbles 48, two of the six flap valves 60 are positioned at the ends of passageway 62 to control air flow through passageway 62 and the remaining two flap valves 60 are positioned at the ends of passageway 63 to control air flow through passageway 63.

Each hinged valve 60 is a hydraulically operated valve which is open and closed by a hydraulic actuator 68. Hydraulic actuator 68 has a rod 67 which is connected to flap valve 60. When actuator 68 of any one of the flap valves 60 retracts its associated rod 67, the flap valve 60 is opened allowing unburnt air from engine 54 to enter the bed of pebbles 48. Similarly, when actuator 68 of any one of the flap valves 60 extends its associated rod 67, the flap valve 60 is closed preventing unburnt air from engine 54 from entering the bed of pebbles 48 through that flap valve 60.

Airborne contaminants within the air stream 55 entering the bed of pebbles 48 are incinerated by the bed of pebbles 48 with additional heat being supplied in a temperature range of about 1000 to 3000 degrees fahrenheit to the bed of pebbles 48 by a plurality of gas burning elements 49. Gas burner elements 49 are positioned at the front of end of after-burning incinerator 30 and are connected to a plurality of radial supply lines 45 which supply fuel to the gas burning elements 49. There is also attached to the outer surface of after-burning incinerator 30 a ring shape supply line 50 which encircles after-burning incinerator 30 and is connected to radial supply lines 45 as well as an external supply line 47. External supply line 47 is connected to a source of fuel, not illustrated, which provides fuel under pressure to the gas burning elements 49 of after-burning incinerator 30.

As shown in FIG. 3 unburnt air 51 from gas turbine engine 54 enters the bed of pebbles 48 through retaining screen 64 and passageway 63, but not through passageway 62 since the flap valves 60 to passageway 62 are closed.

Referring to FIGS. 1 and 3, the rear end of after-burning incinerator 30 has a curved portion 56 which connects to vertical exhaust stack 32. The bed of pebbles 48 provides effluent air streams comprising purified air at the air exhaust of the cylindrical shaped after-burning incinerator 30 with the effluent being supplied to exhaust stack 32. Although not illustrated vertical exhaust stack may include a water spray system to cool air streams exiting after-burning incinerator 30 and to remove any remaining airborne contaminants from the airstream exiting after-burning incinerator 30. Further, the exhaust stack 32 may also include a monitoring system for monitoring the air quality of the airstream exhaust stack 32.

From the foregoing, it may readily be seen that the present invention comprises a new, unique and exceedingly useful system for the removal and disposal of airborne contaminants from an outdoor paint booth which constitutes a considerable improvement over the known prior art. Obviously, many modifications and variations of the present invention are possible in light of the above teachings. Therefore it is to be understood that within the scope of the appended claims that the invention may be practiced otherwise than as specifically described.

What is claimed is:

1. A system for the treatment of contaminated air from an outdoor spray paint booth, said system comprising:

an underground pool having a base and first, second, third and fourth side walls extending perpendicularly upward from said base, said first, second, third and fourth side walls being arranged end to end to define a generally rectangular shaped structure, said underground pool having a lower water containment portion filled with a pool of water and an upper portion;

a plenum positioned adjacent the first side wall of said underground pool, said plenum having an airtight inner chamber;

a grillwork mounted on top of said underground pool, said grillwork being adapted to support an aircraft having a spray paint applied thereto;

a plurality of suction pipes uniformly distributed throughout the upper portion of said underground pool, said plurality of suction pipes extending from the upper portion of said underground pool through the first side wall of said underground pool into the airtight inner chamber of said plenum;

each of said plurality of suction pipes having a damper valve for regulating a flow rate of air streams from the upper portion of said underground pool through said suction pipe into the airtight inner chamber of said plenum, said air streams having airborne contaminants from said spray paint contained therein;

said grillwork having a plurality of rectangular shaped openings through which said air streams including said airborne contaminants are drawn from a work area above said grillwork where said aircraft is being painted into the upper portion of said underground pool;

a gas turbine engine having an air inlet connected to said plenum and an air exhaust;

a cylindrical shaped after-burning incinerator having an air inlet connected to the air exhaust of said gas turbine engine and an air exhaust;

said gas turbine engine providing a suction force to draw said air streams including said airborne contaminants through said plurality of suction pipes, said plenum and said gas turbine engine into said cylindrical shaped after-burning incinerator;

said cylindrical shaped after-burning incinerator including an inner cylindrical wall, a first retaining screen positioned at a front end of said inner cylindrical wall, a second retaining screen positioned at a rear end of said inner cylindrical wall and a plurality of gas burning elements positioned at a front end of said cylindrical shaped after-burning incinerator upstream from said first retaining screen;

a bed of pebbles positioned within an area defined by said inner cylindrical wall and said first and second retaining screens, said gas burning elements heating said bed of pebbles to a predetermined temperature range allowing said bed of pebbles to incinerate the airborne contaminants within said air streams entering said bed of pebbles through said first retaining screen, said bed of pebbles providing effluent air streams comprising purified air at the air exhaust of said cylindrical shaped after-burning incinerator.

2. The system of claim 1 wherein said bed of pebbles comprises a quartz bed of pebbles.

3. The system of claim 1 wherein said bed of pebbles comprises a zirconium bed of pebbles.

4. The system of claim 1 wherein said bed of pebbles comprises a ceramic bed of pebbles.

5. The system of claim 1 wherein the predetermined temperature range said gas burning elements heat said bed of pebbles is from about 1000 degrees fahrenheit to about 3000 degrees fahrenheit.

6. The system of claim 1 further comprising a plurality of I beams extending from the second side wall of said underground pool to the fourth side wall of said underground pool, said I beams being positioned substantially parallel to said first and third walls of said underground pool, said I beams providing support for said grillwork.

7. A system for the treatment of contaminated air from an outdoor spray paint booth, said system comprising:

an underground pool having a base and first, second, third and fourth side walls extending perpendicularly upward from said base, said first, second, third and fourth side walls being arranged end to end to define a generally rectangular shaped structure, said underground pool having a lower water containment portion filled with a pool of water and an upper portion;

a plenum positioned adjacent the first side wall of said underground pool, said plenum having an airtight inner chamber;

a grillwork mounted on top of said underground pool, said grillwork being adapted to support an aircraft having a spray paint applied thereto;

a plurality of suction pipes uniformly distributed throughout the upper portion of said underground pool, said plurality of suction pipes extending from the upper portion of said underground pool through the first side wall of said underground pool into the airtight inner chamber of said plenum;

each of said plurality of suction pipes having a damper valve for regulating a flow rate of air streams from the upper portion of said underground pool through said suction pipe into the airtight inner chamber of said plenum, said air streams having airborne contaminants from said spray paint contained therein;

each of said plurality of suction pipes having a right angle bend near the end of said suction pipe within the upper portion of said underground pool, said right angle bend extending said suction pipe vertically downward to a height of between one and two inches above the pool of water;

said grillwork having a plurality of rectangular shaped openings through which said air streams including said airborne contaminants are drawn from a work area above said grillwork where said aircraft is being painted into the upper portion of said underground pool;

a gas turbine engine having an air inlet connected to said plenum and an air exhaust;

a cylindrical shaped after-burning incinerator having an air inlet connected to the air exhaust of said gas turbine engine and an air exhaust;

said gas turbine engine providing a suction force to draw said air streams including said airborne contaminants through said plurality of suction pipes, said plenum and said gas turbine engine into said cylindrical shaped after-burning incinerator;

said cylindrical shaped after-burning incinerator including an inner cylindrical wall, a first retaining screen positioned at a front end of said inner cylindrical wall, a second retaining screen positioned at a rear end of said inner cylindrical wall and a plurality of gas burning elements positioned at a front end of said cylindrical shaped after-burning incinerator upstream from said first retaining screen;

a bed of pebbles positioned within an area defined by said inner cylindrical wall and said first and second retaining screens, said gas burning elements heating said bed of pebbles to a predetermined temperature range allowing said bed of pebbles to incinerate the airborne contaminants within said air streams entering said bed of pebbles through said first retaining screen, said bed of pebbles providing effluent air streams comprising purified air at the air exhaust of said cylindrical shaped after-burning incinerator; and a vertical exhaust stack connected to the air exhaust of said cylindrical shaped after-burning incinerator.

8. The system of claim 7 wherein said bed of pebbles comprises a quartz bed of pebbles.

9. The system of claim 7 wherein said bed of pebbles comprises a zirconium bed of pebbles.

10. The system of claim 7 wherein said bed of pebbles comprises a ceramic bed of pebbles.

11. The system of claim 7 wherein the predetermined temperature range said gas burning elements heat said bed of pebbles is from about 1000 degrees fahrenheit to about 3000 degrees fahrenheit.

12. The system of claim 7 further comprising a plurality of I beams extending from the second side wall of said underground pool to the fourth side wall of said underground pool, said I beams being positioned substantially parallel to said first and third walls of said underground pool, said I beams providing support for said grillwork.

13. A system for the treatment of contaminated air from an outdoor spray paint booth, said system comprising:

an underground pool having a base and first, second, third and fourth side walls extending perpendicularly upward from said base, said first, second, third and fourth side walls being arranged end to end to define a generally rectangular shaped structure, said underground pool having a lower water containment portion filled with a pool of water and an upper portion;

a plenum positioned adjacent the first side wall of said underground pool, said plenum having an airtight inner chamber;

a grillwork mounted on top of said underground pool, said grillwork being adapted to support an aircraft having a spray paint applied thereto;

a plurality of suction pipes uniformly distributed throughout the upper portion of said underground pool, said plurality of suction pipes extending from the upper portion of said underground pool through the first side wall of said underground pool into the airtight inner chamber of said plenum;

each of said plurality of suction pipes having a damper valve for regulating a flow rate of air streams from the upper portion of said underground pool through said suction pipe into said the airtight inner chamber of said plenum, said air streams having airborne contaminants from said spray paint contained therein;

each of said plurality of suction pipes having a right angle bend near the end of said suction pipe within the upper portion of said underground pool, said right angle bend extending said suction pipe vertically downward to a height of between one and two inches above the pool of water;

said grillwork having a plurality of rectangular shaped openings through which said air streams including said airborne contaminants are drawn from a work area above said grillwork where said aircraft is being painted into the upper portion of said underground pool;

a gas turbine engine having an air inlet connected to said plenum and an air exhaust;

a cylindrical shaped after-burning incinerator having an air inlet connected to the air exhaust of said gas turbine engine and an air exhaust;

said gas turbine engine providing a suction force to draw said air streams including said airborne contaminants through said plurality of suction pipes, said plenum and said gas turbine engine into said cylindrical shaped after-burning incinerator;

said cylindrical shaped after-burning incinerator having an outer cylindrical wall and an inner cylindrical wall, an outer passageway formed between said outer cylindrical wall and said inner cylindrical wall, a first retaining screen positioned at a front end of said inner cylindrical wall, a second retaining screen positioned at a rear end of said inner cylindrical wall and a plurality of gas burning elements positioned at a front end of said cylindrical shaped after-burning incinerator upstream from said first retaining screen;

a bed of pebbles positioned within an area defined by said inner cylindrical wall and said first and second retaining screens, said gas burning elements heating said bed of pebbles to a predetermined temperature range allowing said bed of pebbles to incinerate the airborne contaminants within said air streams entering said bed of pebbles through said first retaining screen, said bed of pebbles providing effluent air streams comprising purified air at the air exhaust of said cylindrical shaped after-burning incinerator;

said cylindrical shaped after-burning incinerator having first and second inner passageways connected to said outer passageway and passing through said bed of pebbles, said first inner passageway being positioned at a center portion of said bed of pebbles and said second inner passageway being positioned within said bed of pebbles about halfway between said first inner passageway and said second retaining screen, said first and second inner passageways having a plurality of openings for allowing said air streams including said airborne contaminants to enter the center portion and rear portion of said bed on pebbles; and a vertical exhaust stack connected to the air exhaust of said cylindrical shaped after-burning incinerator.

14. The system of claim 13 wherein said bed of pebbles comprises a quartz bed of pebbles.

15. The system of claim 13 wherein said bed of pebbles comprises a zirconium bed of pebbles.

16. The system of claim 13 wherein said bed of pebbles comprises a ceramic bed of pebbles.

17. The system of claim 13 wherein the predetermined temperature range said gas burning elements heat said bed of pebbles is from about 1000 degrees fahrenheit to about 3000 degrees fahrenheit.

18. The system of claim 13 further comprising a plurality of I beams extending from the second side wall of said underground pool to the fourth side wall of said underground pool, said I beams being positioned substantially parallel to said first and third walls of said underground pool, said I beams providing support for said grillwork.

19. The system of claim 13 further comprising first, second, third and fourth flap valves, said first and second flap valves being positioned at opposed ends of said first inner passageway to control the flow of said air streams into said first inner passageway from said outer passageway and said third and fourth flap valves being positioned at opposed ends of said second inner passageway to control the flow of said air streams into said second inner passageway from said outer passageway.

* * * * *